US009536362B2

United States Patent
Sarwar et al.

(10) Patent No.: US 9,536,362 B2
(45) Date of Patent: *Jan. 3, 2017

(54) POLARIZED IMAGES FOR SECURITY

(71) Applicant: Apple Inc., Cupertino, CA (US)

(72) Inventors: Mushtaq A. Sarwar, Cupertino, CA (US); Brett Bilbrey, Cupertino, CA (US); Peng Zheng, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 410 days.

This patent is subject to a terminal disclaimer.

(21) Appl. No.: 14/279,648

(22) Filed: May 16, 2014

(65) Prior Publication Data

US 2014/0247361 A1    Sep. 4, 2014

Related U.S. Application Data

(63) Continuation of application No. 13/088,286, filed on Apr. 15, 2011, now Pat. No. 8,760,517.

(Continued)

(51) Int. Cl.
*G08B 13/02* (2006.01)
*G07C 9/00* (2006.01)
(Continued)

(52) U.S. Cl.
CPC .............. *G07C 9/00158* (2013.01); *G01J 4/00* (2013.01); *G02B 27/26* (2013.01);
(Continued)

(58) Field of Classification Search
CPC .......... G01J 4/00; G02B 27/26; G06T 7/0075; G06T 7/0077; H04N 13/0242; H04N 13/025; H04N 13/0271
See application file for complete search history.

(56) References Cited

U.S. PATENT DOCUMENTS 4,437,089 A    3/1984 Achard
5,903,350 A    5/1999 Bush et al.
(Continued)

FOREIGN PATENT DOCUMENTS

CN    101639800    2/2010
DE    102008047413    4/2010
(Continued)

OTHER PUBLICATIONS

Rahmann et al., "Reconstruction of Specular Surfaces Using Polarization Imaging," Proceedings of the IEEE Computer Conference on Computer Vision and Pattern Recognition, pp. I-149-I-155, 2001.

(Continued)

*Primary Examiner* — Dave Czekaj
*Assistant Examiner* — Md Haque
(74) *Attorney, Agent, or Firm* — Brownstein Hyatt Farber Schreck, LLP

(57) ABSTRACT

One embodiment may take the form of a method for providing security for access to a goal including storing a first image and receiving a second image comprising polarized data. The method also includes comparing the first image with the second image to determine if the first image and the second image are substantially the same. In the event the first and second images are not substantially the same, the method includes denying access to the goal. In the event the first and second images are substantially the same, the method includes determining, utilizing the polarized information, if the second image is of a three-dimensional object. Further, in the event the second image is not of a three-dimensional object, the method includes denying access to the goal and, in the event the second image is of a three-dimensional object, permitting access to the goal.

20 Claims, 8 Drawing Sheets

Related U.S. Application Data

(60) Provisional application No. 61/386,865, filed on Sep. 27, 2010.

(51) Int. Cl.
| | |
|---|---|
| *G01J 4/00* | (2006.01) |
| *G02B 27/26* | (2006.01) |
| *G06T 7/00* | (2006.01) |
| *H04N 13/02* | (2006.01) |
| *G06K 9/00* | (2006.01) |

(52) U.S. Cl.
CPC ........ *G06K 9/00255* (2013.01); *G06T 7/0075* (2013.01); *G06T 7/0077* (2013.01); *H04N 13/025* (2013.01); *H04N 13/0242* (2013.01); *H04N 13/0271* (2013.01)

(56) References Cited

U.S. PATENT DOCUMENTS

| | | | |
|---|---|---|---|
| 6,072,894 A * | 6/2000 | Payne ................ | G07C 9/00158 235/375 |
| 6,146,332 A | 11/2000 | Pinsonneault et al. | |
| 6,359,664 B1 | 3/2002 | Faris | |
| 6,603,502 B2 | 8/2003 | Martin et al. | |
| 6,775,397 B1 | 8/2004 | Hamalainen | |
| 6,802,016 B2 | 10/2004 | Liu | |
| 6,832,006 B2 | 12/2004 | Savakis et al. | |
| 7,006,236 B2 | 2/2006 | Tomasi et al. | |
| 7,009,378 B2 | 3/2006 | Blake et al. | |
| 7,117,380 B2 | 10/2006 | Kangas | |
| 7,136,513 B2 | 11/2006 | Waehner et al. | |
| 7,151,530 B2 | 12/2006 | Roeber et al. | |
| 7,164,781 B2 | 1/2007 | Kim et al. | |
| 7,317,868 B2 | 1/2008 | Oshima et al. | |
| 7,324,824 B2 | 1/2008 | Smith et al. | |
| 7,369,685 B2 | 5/2008 | DeLean | |
| 7,436,569 B2 | 10/2008 | Yao et al. | |
| 7,536,037 B2 | 5/2009 | Sung et al. | |
| 7,806,604 B2 * | 10/2010 | Bazakos et al. ... | G06K 9/00255 348/153 |
| 7,840,031 B2 | 11/2010 | Albertson et al. | |
| 7,903,166 B2 | 3/2011 | Daly | |
| 7,929,729 B2 | 4/2011 | Huang et al. | |
| 8,107,721 B2 | 1/2012 | Beardsley et al. | |
| 8,154,615 B2 | 4/2012 | Fedorovskaya et al. | |
| 8,264,536 B2 | 9/2012 | McEldowney | |
| 8,345,086 B2 | 1/2013 | Hirasawa | |
| 8,462,989 B2 | 6/2013 | Mevissen | |
| 8,698,753 B2 | 4/2014 | Jung et al. | |
| 8,880,865 B2 | 11/2014 | Abernethy et al. | |
| 8,912,877 B2 | 12/2014 | Ling et al. | |
| 2002/0158750 A1 | 10/2002 | Almalik | |
| 2003/0108341 A1 | 6/2003 | Oshima et al. | |
| 2003/0142853 A1 | 7/2003 | Waehner et al. | |
| 2005/0071698 A1 | 3/2005 | Kangas | |
| 2005/0221791 A1 | 10/2005 | Angelhag | |
| 2006/0274177 A1 | 12/2006 | Masaki et al. | |
| 2007/0172099 A1 | 7/2007 | Park et al. | |
| 2007/0223078 A1 | 9/2007 | Yao et al. | |
| 2008/0170123 A1 | 7/2008 | Albertson et al. | |
| 2009/0015666 A1 | 1/2009 | Greenway et al. | |
| 2009/0190846 A1 | 7/2009 | Mevissen | |
| 2009/0219251 A1 | 9/2009 | Jung et al. | |
| 2009/0297020 A1 | 12/2009 | Beardsley et al. | |
| 2010/0008900 A1 | 1/2010 | Chan et al. | |
| 2010/0013951 A1 * | 1/2010 | Rodriguez et al. ... | G06T 1/0064 348/222.1 |
| 2010/0231522 A1 | 9/2010 | Li | |
| 2010/0253782 A1 | 10/2010 | Elazary | |
| 2010/0328074 A1 | 12/2010 | Johnson et al. | |
| 2011/0074989 A1 | 3/2011 | Fossum et al. | |
| 2011/0262044 A1 | 10/2011 | Wang | |
| 2012/0036261 A1 | 2/2012 | Salazar et al. | |
| 2012/0075432 A1 | 3/2012 | Sarwar et al. | |
| 2012/0075473 A1 | 3/2012 | Sarwar et al. | |
| 2012/0287031 A1 | 11/2012 | Valko et al. | |
| 2012/0287035 A1 | 11/2012 | Valko et al. | |

FOREIGN PATENT DOCUMENTS

| | | |
|---|---|---|
| EP | 1672460 | 6/2006 |
| EP | 2216999 | 8/2010 |
| EP | 2315439 | 4/2011 |
| GB | 2453163 | 4/2009 |
| JP | 2002350555 | 12/2002 |
| JP | 2004348349 | 12/2004 |
| JP | 2007519317 | 7/2007 |
| WO | WO 2010/021375 | 2/2010 |
| WO | WO 2010/073547 | 7/2010 |
| WO | WO 2010/095075 | 8/2010 |
| WO | WO 2010/113075 | 10/2010 |
| WO | WO 2010/127488 | 11/2010 |

OTHER PUBLICATIONS

Sano et al., "Submicron Spaced Lens Array Process Technology for a High Photosensitivity CCD Image Sensor," IEEE, pp. 283-286, Dec. 1990.

Wolff et al., "Polarization Camera Sensors," Image and Vision Computing, pp. 497-510, vol. 13, No. 6, Aug. 1995.

* cited by examiner

POLARIZED IMAGES FOR SECURITY

CROSS-REFERENCE TO RELATED APPLICATION

This application is a continuation of U.S. patent application Ser. No. 13/088,286, filed Apr. 15, 2011, entitled "Polarized Images for Security," which claims the benefit under 35 U.S.C. §119(e) of U.S. Provisional Patent Application No. 61/386,865, filed on Sep. 27, 2010, entitled "Image Capture Using Three-Dimensional Reconstruction," the disclosures of which are incorporated by reference as if fully disclosed herein

TECHNICAL FIELD

The present disclosure relates to using images for security and, more particularly, to using polarized images for security

BACKGROUND

Facial recognition software has been used in a variety of different contexts. One use that has seen particular interest has been facial recognition for security. In one example, an image may be captured of a computer user and the image is compared against a stored image to determine if the user may access the computer. In comparing the captured image with the stored image, a variety of metrics may be utilized to determine if the images correspond. For example, ratios related to particular features may be used such as the length of the nose to the width of the eyes or the length from the nose to the chin to the width between the cheek bones. In some embodiments, raw measurements and/or unique features may be utilized. Generally, however, current facial recognition software is unable to distinguish when a human is replaced with a photograph or other object. As such, a security system based on facial recognition may be bypassed by simply providing a photograph of a verifiable user

SUMMARY

Security techniques and systems are provided. In particular, the techniques may include facial recognition security features combined with a determination as to whether an object captured in an image is a three-dimensional object. This determination is based on polarization characteristics contained in the captured image.

One embodiment may take the form of a method for providing security for access to a goal including storing a first image and receiving a second image comprising polarized data.
The method also includes comparing the first image with the second image to determine if the first image and the second image are substantially the same. In the event the first and second images are not substantially the same, the method includes denying access to the goal. In the event the first and second images are substantially the same, the method includes determining, utilizing the polarized information, if the second image is of a three-dimensional object. Further, in the event the second image is not of a three-dimensional object, the method includes denying access to the goal and, in the event the second image is of a three-dimensional object, permitting access to the goal.

Another embodiment may take the form of a security system including a polarizing image capture device and a processor coupled to the polarizing image capture device. A storage device coupled to the processor and operative to store a group of stored images. The processor is configured to compare images captured by the image capture device with at least one of the group of stored images. Additionally, the processor is configured to determine if an image captured by the polarizing image capture device is of a three-dimensional object.

Yet another embodiment may take the form of a security system having a processor and a camera coupled to the processor. The camera includes a photosensor, a Bayer layer, and a polarizing filter. The processor is configured to analyze images captured by the camera and determine if an object in the image is a three dimensional object based at least in part upon variance in one of a degree of polarization, angle of polarization, and surface normals of the captured image.

While multiple embodiments are disclosed, still other embodiments of the present invention will become apparent to those skilled in the art from the following Detailed Description. As will be realized, the embodiments are capable of modifications in various aspects, all without departing from the spirit and scope of the embodiments. Accordingly, the drawings and detailed description are to be regarded as illustrative in nature and not restrictive.

DETAILED DESCRIPTION

Generally, a polarization camera is implemented with a security system to obtain polarized information of light reflected from an object captured in an image by the camera. This polarized information may be used in the determination of whether the object captured in the image is three-dimensional and/or if the object manifests human/living characteristics. These techniques may help improve security by preventing the use of photographs of individuals and/or inanimate busts of the same to bypass security based on facial recognition. Access to a goal, which may be physical (e.g., an object) or virtual (e.g., data) may be controlled by the techniques, methods and/or systems described herein.

A polarization camera is based on the natural phenomenon that when unpolarized light, such as sunlight, is reflected by an object surface or human face, it becomes partially polarized. There are two physical mechanisms in the reflection process. The first is specular reflection, where light is directly reflected by a smooth surface. The second type of reflection mechanism is diffuse reflection, where the light reflects off a rough surface, or penetrates into the material's surface and reflects out after several internal reflections inside the material. In most natural environments, diffuse reflection is dominant form of reflection and can be used to identify a person or object.

By using a standard digital camera with a linear polarizer in front of the lens, polarization data at different polarization angles may be obtained. Using three or more polarized images, an estimate of the degree of linear polarization (DOLP) and the angle of polarization (AOP) per pixel may be calculated. These values can then be used to determine the zenith angle and the azimuth angle, which in turn define the surface normal for a particular pixel.

Generally, a two-dimensional (2D) image has a small change in DOLP, AOP and surface normal, as the surface is flat. In contrast, a three-dimensional (3D) object or human face has a significant difference in DOLP, AOP and surface normal. As such, an image based security system may further utilize these polarization parameter for helping to ensure that a physical person is present rather than simply an image of the person. Additionally, in some implementations, movements of the individual may be utilized such as, pulse and/or respiration rate; movement of eyes, jaw, cheeks, lips, head and/or clothing; or other such movements to help ensure that a 3D model or other device is not used in an attempt to bypass the security system.

Figure 1:
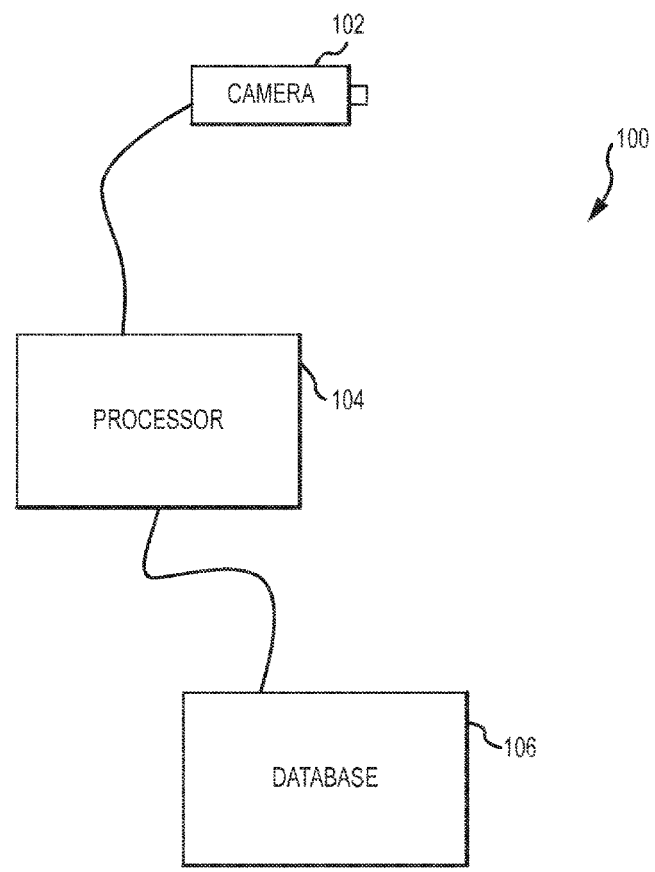
FIG. 1 illustrates a security system.

FIG. 1 illustrates an image based security system 100. The image based security system 100 generally includes a camera 102, a processing system 104 and a database 106. The camera 102 may take the form of a digital camera configured to capture images of individuals desiring access to a particular location, computer, system, network, and/or so forth. Generally, the camera 102 is configured with a polarizer, as discussed in greater detail below. The processing system 104 may take any suitable form, such as a desktop computer, notebook computer, application specific integrated circuit, and so forth, and is configured to compare images captured by the camera 102 with those stored in the database 106. The database 106 may include images of individuals for which access may be granted. As an initial measure of security, recognition of an individual as being included in the database 106 based upon characteristics of the individual may be implemented. Various techniques are known in the art for facial recognition for these purposes and one or more of these may be implemented.

Additionally, in some embodiments, the database 106 may include images of individuals that are of interest for some reason. For example, if there are individuals who have been known to attempt, or have an interest in attempting to bypass the security system 100. Alerts may be trigged upon recognizing one of these individuals.

In some embodiments, one or more components may be located remotely from the other components. For example, the camera 102 may be located at an entrance point of a facility and may be in communication with the processing system 104 located at a security base for the facility. The processing system 104 may communicate with the database 106 via a network (e.g., local area network, wide area network, the Internet, and/or so forth) which may or may not be co-located with the processing system. In other embodiments, each component of the system 100 may be included within a single housing. That is, for example, the camera 102, the processing system 104, and the database 106 may be housed within a single housing, such as in a notebook or tablet computing device, for example.

Figure 2:
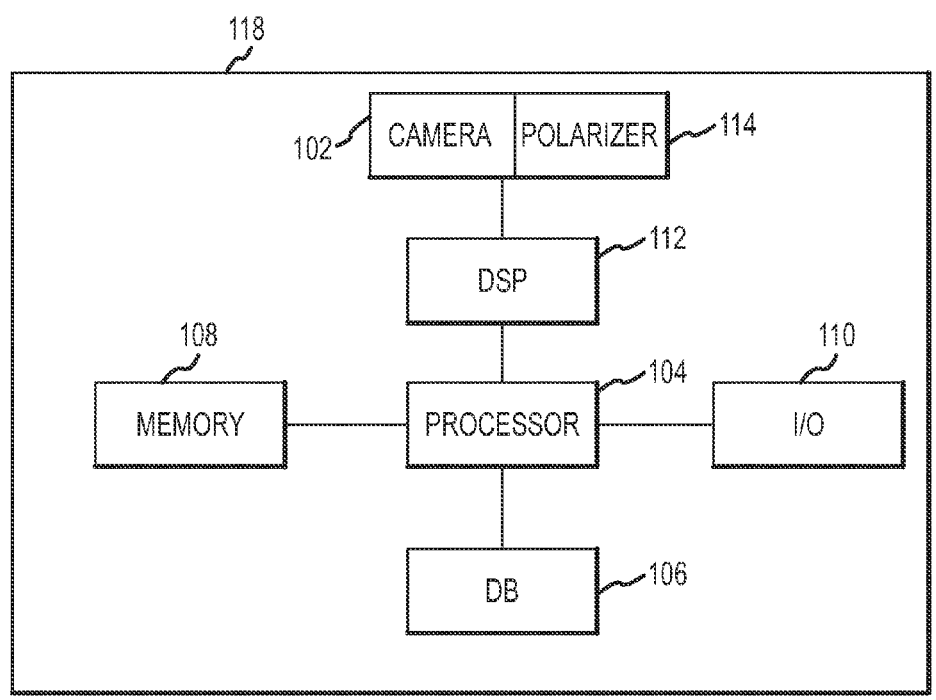
FIG. 2 is a block diagram of the security system of FIG. 1.

FIG. 2 illustrates a block diagram of a security system 118 as it may be implemented in a single computing system. In addition to the aforementioned components, the system 118 may include a memory 108 and I/o devices 110. Further, a digital signal processing (DSP) unit 112 may be coupled to the camera 102 in some embodiments. Generally, the DSP unit 112 may includes a dedicated processing unit(s) that are provided to process the images captured by the camera 102. This may alleviate the processing burden on the processing system 104 which may be a central processing unit for the system 100. In some embodiments, the DSP unit 112 may be configured to compute the DOLP, AOP and surface normals for images captured by the camera 102, while in other embodiments, the processing system 104 performs these calculations.

Figure 3:
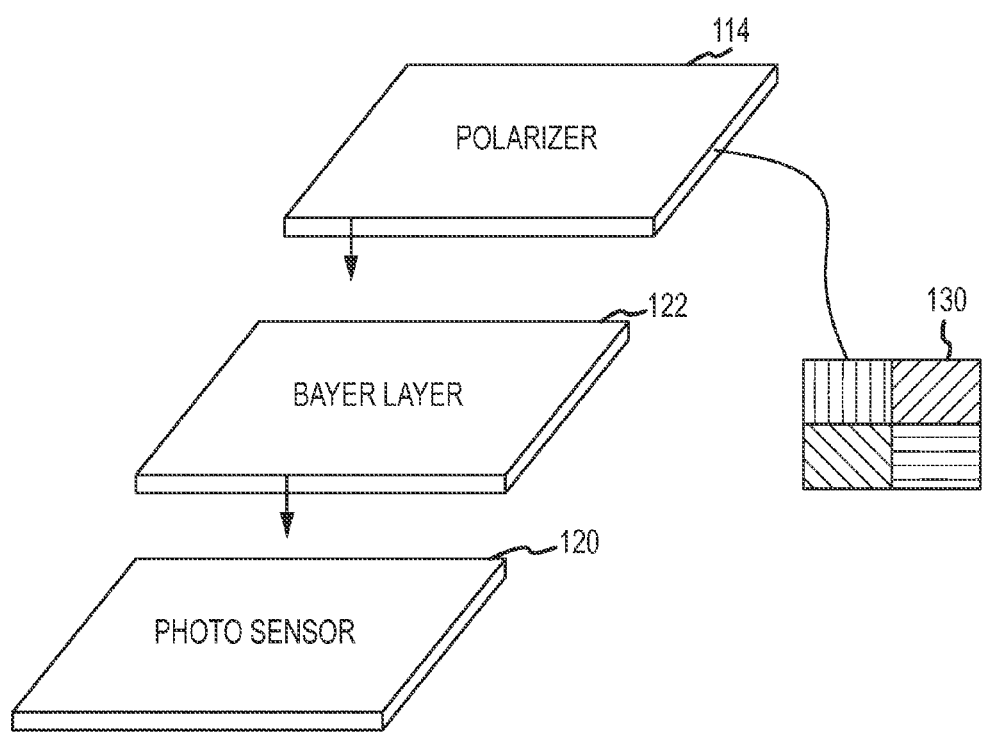
FIG. 3 illustrates layers of a camera of the security system of FIG. 1.

The camera 102 includes a polarizer 114 which is also shown in FIG. 3. FIG. 3 illustrates layers included in the optical path for image capture. A light sensor 120 detects light that passes through a Bayer layer 122 and the polarizer 114. The light sensor 120 may take any suitable form including a charge coupled device (CCD) sensor or a complementary metallic-oxide semiconductor (CMOS) sensor. The Bayer layer 122 is a color filter that filters red, green and blue components of light. The Bayer layer 122 is divided into four block squares with each square including two green blocks, one red block and one blue block. This is due, at least in part, on the relative sensitivity of the human eye to green colors. In some embodiments, the blocks correspond in a one to one ratio with the pixels of the light sensor 120.

The polarizer 114 is a linear polarizer (e.g., a laminate wire grid polarizer) and is configured to filter polarized light based on the angle of the polarized light. Specifically, the polarizer may be divided into four block squares with the blocks being at 0, 45, 90 and −45 degrees polarization angles. A four block square 130 is shown inset. Each block of the four block square may correspond with a single pixel of a captured image. As such, four images may be generated at ¼ resolution of the sensor 120. Moreover, each block may correspond with a particular color block of the Bayer layer 122. In some embodiments, the polarizer 114 may be integrated into the Bayer layer 122, while in other embodiments the polarizer 114 may be a separate layer.

Figure 4:
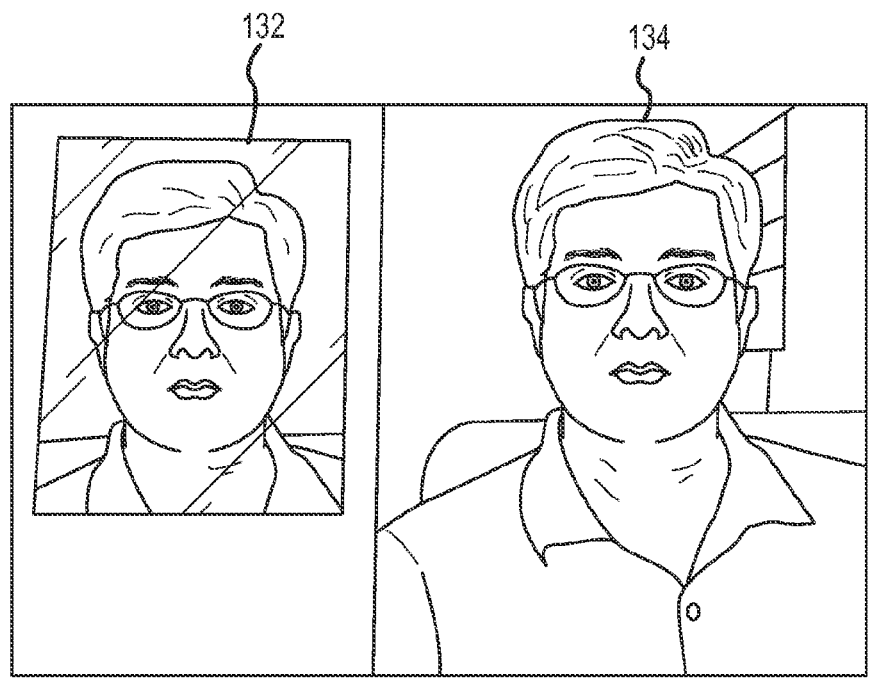
FIG. 4 illustrates a captured image of a person and an picture of the same person.
Figure 5:
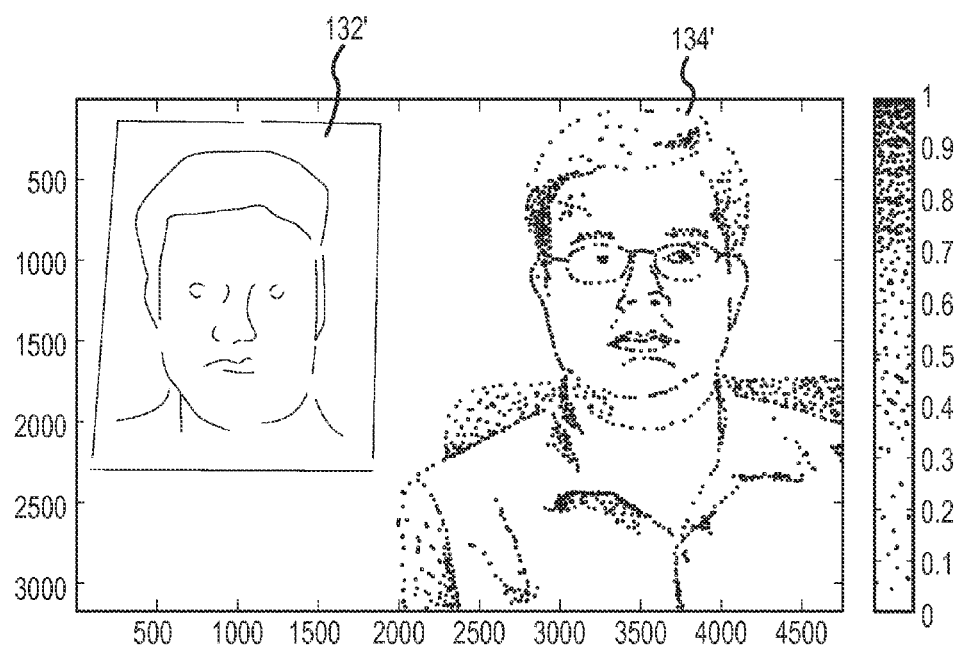
FIG. 5 illustrates results of a degree of polarization analysis on the captured image of FIG. 4.
Figure 6:
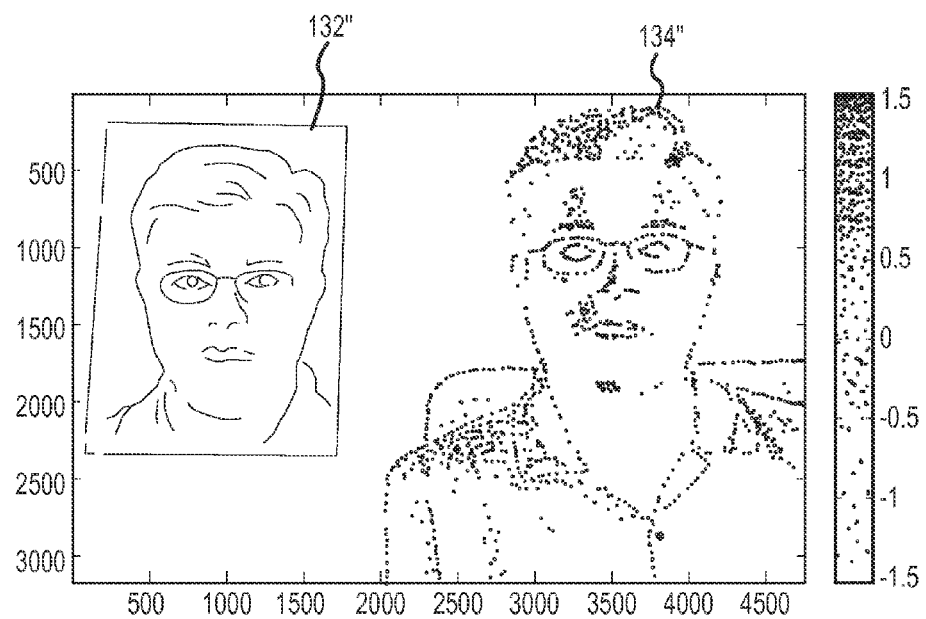
FIG. 6 illustrates results of an angle of polarization analysis on the captured image of FIG. 4.

The digital camera 102 with the polarizer 114 was used to capture an image of a person (3D object) next to a 2D picture of that person to demonstrate the ability to distinguish between a 2D object and a 3D object. FIG. 4 illustrates the 2D image 132 next to the person 134. FIGS. 5 and 6 illustrate the resulting image after stokes parameters are used for computing DOLP and AOP, respectively.

By way of providing background, Stokes parameters are generally used to describe polarized light. The Stokes parameters describe the polarization state in terms of measurable intensities.

$$S_0 = I_0 + I_{90};$$

$$S_1 = I_0 + I_{90};$$

$$S_2 = I_{45} - I_{-45};$$

where $I_0$, $I_{45}$, $I_{-45}$, and $I_{90}$ are the measured intensity values of the light through the polarizer oriented at 0°, 45°, −45° and 90° respectively. This formula is used in the practical application because the required parameters $I_{0°}$, $I_{90°}$, $I_{+45}$, and $I_{-45°}$, can be easily obtained by measuring the light intensity after passing through the polarization filter along different axis (e.g., by putting a polarization filter along vertical axis, the light intensity recorded behind this filter is $I_{0°}$).

From the Stokes parameters, the degree of linear polarization, angle of polarization and surface normals can be calculated for each of the pixels of the captured image. Specifically:

$$DOLP = \rho = \frac{\sqrt{S_1^2 + S_2^2}}{S_0};$$

$$AOP = \alpha = \frac{1}{2}\mathrm{atan}\left(\frac{S_2}{S_1}\right);$$

and the surface normal components in X, Y, and Z planes are given by:

$$SN_x = \cos(\alpha)\sin(\theta);$$

$$SN_y = \sin(\alpha)\sin(\theta);$$

$$SN_z = \cos(\theta);$$

where the zenith angle θ, is calculated by numerical solving the equation:

$$\rho = \frac{(n - 1/n)^2 \sin^2\theta}{2 + 2n^2 - (n + 1/n)^2\sin^2\theta + 4\cos\theta\sqrt{n^2 - \sin^2\theta}}$$

and n is the refractive index of the surface material. It should be appreciated that other formulas may be utilized to calculate the DOLP and AOP, such as, for example, $$DOLP = \left\|\frac{S_1 + iS_2}{S_0}\right\|$$

$$AOP = \frac{1}{2}\mathrm{Arg}(S_1 iS_2),$$

where Arg is the angle of the complex number. ∥ ∥ is the absolute value of the complex number.

FIG. 5 illustrates the difference in the degree of linear polarization between the 2D picture 132' and the person 134'. In FIG. 5, the scale running along the left side and bottom is number of pixels, although any other suitable scale may be implemented. Additionally, the degree of polarization is illustrated with increasing dot density, as indicated in the right side-bar. In other embodiments, the degree of polarization may be shown in different ways, for example the degree of polarization may be color-coded (e.g., certain colors may indicate a greater degree of polarization). In still other embodiments, the degree of polarization may simply be indicated in numerical form (e.g., in a grid or array) with numbers indicating the degree of polarization.

Generally, the degree of polarization is a determination as to how much of the captured light is polarized. Because the 2D picture 132 is flat, the polarization is uniform across the picture. Hence, it is difficult to discern any shapes or features within the portion of the illustration in which the picture is located. In contrast, the 3D image of the person 134' shows areas where there is variance in the polarization due to curvature of the face, shoulders, etc. Hence, the degree of polarization metric may be used to determine if a captured image is of a 2D or 3D object by simply scanning for changes in the degree of linear polarization in the image.

In some embodiments, scanning for changes in the degree of linear polarization may include using threshold values (such as a variance from a baseline value that may represent the degree of linear polarization for a flat object) as indicating a 3D object. Additionally, or alternatively, analysis may include determining if a certain number of pixels exhibit non-uniform degree of linear polarization. In still other embodiments, more complex analysis may be implemented to evaluate if an image of 3D object has been captured based on the degree of linear polarization.

In some embodiments, the rendering of the images to represent the degree of polarization may include a color coded image that indicates the degree of polarization for the individual pixels. For example, in some embodiments, 0 degree of polarization may be indicated by a dark blue color, pixels having greater polarization may be represented by green, yellow, orange and red colors, so that differences in degrees of polarization may be visual discerned. In other embodiments, an array of numbers may be generated that represent the degree of linear polarization and the numerical values of each pixel may be compared with other pixe3l values.

FIG. 6 illustrates the difference in the angle of polarization between the 2D picture 132 and the person 134. FIG. 6 has the same scale as FIG. 5 and, again, uses dot density for indicating angle or polarization although other techniques may be implemented as well. As with the degree of linear polarization, the flat 2D picture 132" has a uniform angle of polarization. In contrast, the image of the 3D person 134" has a variety of angles of polarization due to the reflecting of light off different contours. Hence, the angle of polarization may be utilized in the determination of whether an object is 2D or 3D in a similar manner as the degree of linear polarization (e.g., analyze the data to find changes/differences in the angle of polarization).

The degree of polarization and angle of polarization may be used to calculate surface normals. The surface normals are vectors that are normal to the surface. As the 2D picture is planer, the surface normals will all be directed in the same direction. In contrast, the surface normals of a 3D object, such as the person, will be pointing in different directions. The calculation of surface normals may be useful in recreating a three dimensional rendering of the object. However, it should be appreciated, that the surface normals may be computed and analyzed independent of recreating the object.

Every material has a unique reflective property which results in unique values for DOLP and AOP. Assuming it is possible to fabricate a 3D bust of a human face and duplicate the reflective property of skin, other factors can be used to differentiate the inanimate object from an actual human by taking motion into consideration. These include but are not limited to: movement of the eyes; subtle movement of the jaws, cheeks, lips; vertical translation of the head during breathing; movement of clothing; and pulse rate, among others. Recognition of these motion nuances and comparing them to unique nuances of human motion can further increase the accuracy of the security systems.

In order to detect the acute movements, the camera 102 may be configured to capture video images of objects. Further, multiple frames of the captured video may be analyzed and compared against each other. Specifically, the degree of polarization, angle of polarization, and/or surface normals may be computed on a single frame, initially, to determine if an object is three dimensional. Subsequently, if it is three-dimensional, the same calculations may be performed on multiple frames and then compared against each other to determine if human characteristic movements are exhibited.

Figure 7:
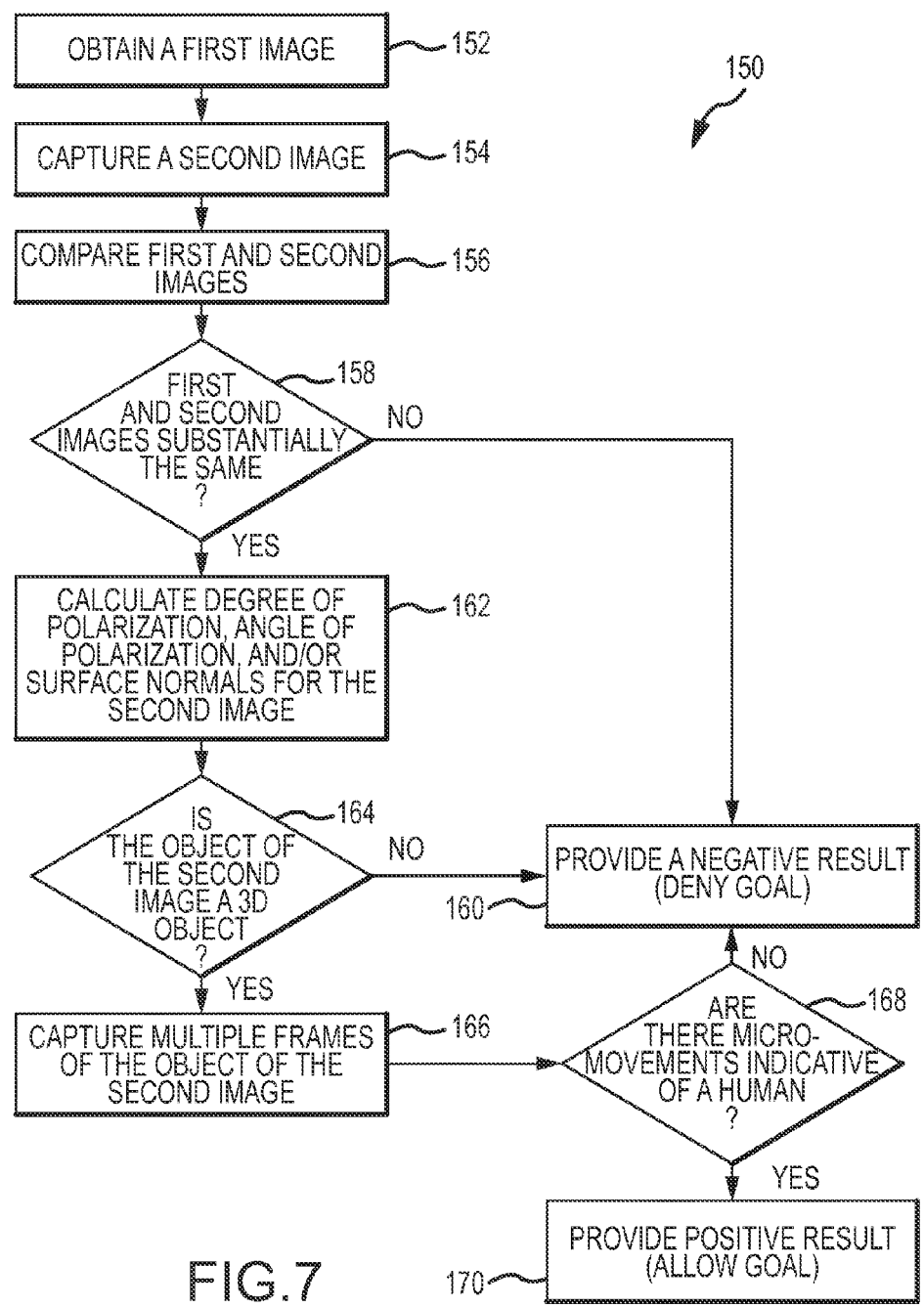
FIG. 7 is a flowchart illustrating an example security method.

FIG. 7 is a flow chart illustrating a method 150 for providing facial recognition security. The method may initially include obtaining a first image of an individual (Block 152). The first image is stored in the database for comparison with subsequently acquired images. In some embodiments, the first image may be obtained without the use of a polarizing camera. That is, in some embodiments, the first image may be utilized solely for the purpose of comparing facial metrics to determine if two images are of a substantially similar individual.

A second image is later acquired (Block 154). The second image is acquired using a polarizing camera (e.g., a camera with a polarizer). The second image is compared with the first image (Block 156) to determine if the second image is substantially the same as the first image (Block 158) or that they are of the same person, object and the like (e.g., there are sufficient common metrics between the two images such that it may be determined that they are of the same person/object). In the event that the first and second images are not of the same person, the database may be searched to see if the second image corresponds to another image in the database. If the second image does not correspond to any of the images in the database, then a negative result may be provided (e.g., access may be denied) (Block 160).

If the first and second image are determined to be of the same person, the degree of polarization, angle of polarization and/or surface normals are computed and analyzed to determine if characteristics of a 2D or 3D object are manifested (e.g., substantially uniform results indicate a 2D object, whereas non-uniform results indicate a 3D object) (Block 162). Thus, it is determined if the second image is of a 3D object (Block 164). If the determination is made that the second image is of a 2D object, then a negative result may be provided (Block 160). In some embodiments, if it is determined that the second image is of a 3D object, a positive result may be provided (e.g., access granted).

Additionally, in some embodiments, if it has been determined that the object in the second image is a 3D object further analysis may be performed to determine if the object is living and/or human. For example, the camera may capture video images (Block 166) and differences between the images may be analyzed to determine if the object is alive (e.g., not a mannequin or a bust of a person). Generally, small scale movements (as opposed to macro movements) may be used for such determinations (Block 168). Specifically, periodic movements corresponding to pulse rate or respiration (e.g., movement of the head) may be used. Further, non-periodic movements, such as movements of the jaw, cheeks, lips, and so on, may indicate that the object in the second image is living.

As such, multiple frames may be compared against each other to detect movements. The small movements may be readily discernable when analyzing images based on the degree of polarization and/or angle of polarization, as any movement that changes the way light is reflected off the object will be shown. If the micro movements are indicative of a human then a positive result may be provided, such as providing access (Block 170).

[It should be appreciated that certain operations discussed above and shown in FIG. 7 may bee omitted in some embodiments, and/or the order of certain operations may be changed. For example, some embodiments may omit blocks 166 and 168. Yet others may determine whether or not an image depicts a three-dimensional object/person prior to attempting to match that image against a known image or person. Accordingly, the operations shown in FIG. 7 and the order thereof are illustrative of a single embodiment and not meant to be limiting.

Generally, a security system may be implemented that utilizes the data in a captured polarized image to perform a function, such as disabling security or initiating an alert, or control access to an object, whether physical or virtual. As one example, the security system may open a door if a subject is recognized and the appropriate security checks are passed (such as determining that the person in the captured image is three-dimensional and/or exhibits motion associated with a live person) and may keep the door locked and closed if not. Likewise, the security system may utilize images containing polarized data not only for physical security, but also for electronic of virtual security. As one example, security systems may be implemented using the technology described herein to control access to electronic systems and/or data. As still another option, security systems incorporating concepts herein may initiate or otherwise control alarm systems.

Figure 8:
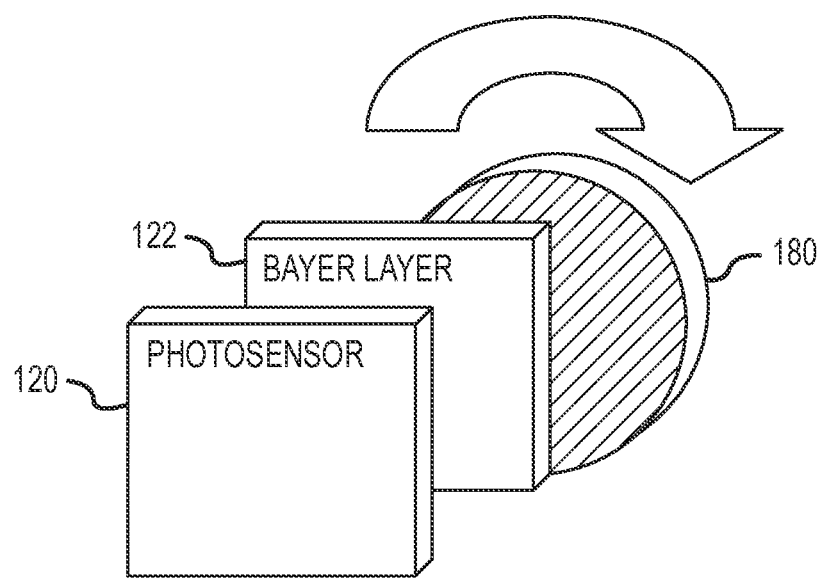
FIG. 8 illustrates layers of a camera of the security system of FIG. 1 in accordance with an alternative embodiment.

FIG. 8 illustrates an alternative embodiment for polarizing a captured image. In particular, the image capture stack includes the photosensor 120 and the Bayer layer 122, but instead of a grid polarizer having four different polarizing angles, such as that shown in FIG. 3, a polarizer 180 may have a single polarizing axis. The polarizer 180 may be configured to rotate in order to achieve the appropriate polarization angles. That is, as the polarizer having only a single axis of polarization is rotated, the photosensor may capture images when it is at 0, 45, 90 and −45 degrees. Hence, four different images are captured at four different times.

The foregoing discussion describes some example embodiments for providing security based at least in part upon capturing a polarized image. Although the foregoing discussion has presented specific embodiments, persons skilled in the art will recognize that changes may be made in form and detail without departing from the spirit and scope of the embodiments. Specifically, for example, as the polarization of light and the ability to detect the polarization of light may be dependent upon and may vary based on a variety of factors such as ambient lighting, the systems 100 and 118 may be provided with an incoherent light source that may be directed at the object being captured. This may help facilitate consistency among captured images. Accordingly, the specific embodiments described herein should be understood as examples and not limiting the scope thereof.

We claim:

1. A method for providing facial recognition security, comprising receiving a first image of an individual captured by a polarizing image capture device;
    comparing facial metrics in the first image to facial metrics in a second image of the individual to determine if the first and second images are of the same individual;
    if the first and second images are of the same individual, determining if the first image is of a three-dimensional object based on polarized data in the image;
    if the first image is of a three-dimensional object, comparing the first image with one or more other images of the individual captured by the polarizing image capture device to determine if a micro-movement indicative of a human occurred between the first image and at least one of the one or more other images; and
    if a micro-movement indicative of a human occurred between the first and at least one of the one or more other images, providing a positive result to the individual.

2. The method as in claim 1, wherein the positive result comprises granting access to the individual.

3. The method as in claim 1, further comprising denying access to the individual if a micro-movement indicative of a human did not occur between the first and the one or more other images.

4. The method as in claim 1, further comprising denying access to the individual if the first image is not of a three-dimensional object.

5. The method as in claim 1, further comprising denying access to the individual if the first and second images are not of the same individual.

6. The method as in claim 5, further comprising generating an alert when the first and second images are not of the same individual.

7. The method as in claim 1, further comprising:
   if the first and second images are not of the same individual, searching a database of images of individuals to determine if the first image corresponds to another image in the database; and
   if the first image does not match any images in the database of images, denying access to the individual.

8. The method as in claim 1, wherein the second image is one of the one or more other images captured by the polarizing image capture device.

9. The method as in claim 1, wherein determining if the first image is of a three-dimensional object based on the polarized data comprises computing at least one of a degree of linear polarization, an angle of polarization, and a surface normal.

10. The method as in claim 9, further comprising computing stokes parameters to compute at least one of the degree of linear polarization, the angle of polarization, and the surface normal.

11. The method as in claim 1, wherein the one or more micro-movements indicative of a human comprises at least one of:
    a respiratory movement;
    a movement induced by a pulse rate; and
    an eye movement;
    a movement of the head;
    a movement of the lips; and
    a movement of clothing worn by the individual.

12. A security system comprising:
    a camera comprising a photosensor and a polarizer, the camera capturing images of an individual;
    a processor coupled to the camera; and a storage device coupled to the processor and operative to store one or more images of an individual;
    wherein the processor is configured to compare at least one captured image of the individual with the one or more stored images to determine if the at least one captured image and the one or more stored images are of the same individual;
    wherein the processor is configured to determine if at least one captured image is of a three-dimensional object based on polarized data in the image,
    wherein the processor is configured to determine if one or more micro-movements indicative of a human occurred between the captured images; and
    wherein the processor is further configured to grant access to the individual if at least one captured image and at least one stored image are of the same individual, if at least one image of the individual captured by the camera is of a three-dimensional object, and if one or more micro-movements indicative of a human occurred between the images.

13. The security system as in claim 12, wherein the processor is further configured to deny access to the individual if at least one image of the individual captured by the camera is of a three-dimensional object.

14. The security system as in claim 12, wherein the processor is further configured to deny access to the individual if one or more micro-movements indicative of a human did not occur between the images.

15. The security system as in claim 12, wherein the processor is further configured to generate an alert and deny access to the individual if individual in the captured images does not match at least one individual in the stored images.

16. The security system as in claim 12, wherein the processor is configured to compute at least one of a degree of linear polarization, an angle of polarization and a surface normal for the captured image when determining if at least one image of the individual captured by the camera is of a three-dimensional object.

17. The security system as in claim 12, wherein the polarizer comprises a linear polarizer divided into four blocks with the blocks having polarization angles of 0, 45, 90, and −45 degrees.

18. The security system as in claim 17, wherein the linear polarizer is integrated into a Bayer layer.

19. The security system as in claim 17, wherein a Bayer layer is disposed between the photosensor and the linear polarizer and each block of the linear polarizer corresponds to a distinct pixel of each captured image and to a particular color block of the Bayer layer.

20. The security system as in claim 12, wherein the polarizer has a single polarizing axis and the polarizer is configured to rotate to capture multiple images at different polarization angles.

* * * * *